(12) United States Patent
Tamura

(10) Patent No.: US 10,075,645 B2
(45) Date of Patent: Sep. 11, 2018

(54) CONTROL OF DISPLAY OF PLURALITY OF ITEMS AND ASSOCIATED INFORMATION

(71) Applicant: SONY CORPORATION, Tokyo (JP)

(72) Inventor: Ayaka Tamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/413,845

(22) PCT Filed: Aug. 13, 2013

(86) PCT No.: PCT/JP2013/071857
§ 371 (c)(1),
(2) Date: Jan. 9, 2015

(87) PCT Pub. No.: WO2014/041948
PCT Pub. Date: Mar. 20, 2014

(65) Prior Publication Data
US 2015/0130980 A1    May 14, 2015

(30) Foreign Application Priority Data
Sep. 11, 2012  (JP) .................... 2012-199286

(51) Int. Cl.
*H04N 5/232* (2006.01)
*G06F 3/0482* (2013.01)
*G06F 3/0484* (2013.01)

(52) U.S. Cl.
CPC ....... *H04N 5/23293* (2013.01); *G06F 3/0482* (2013.01); *G06F 3/04847* (2013.01)

(58) Field of Classification Search
CPC ................................. H04N 5/23293
USPC ..................................... 348/333.02
See application file for complete search history.

(56) References Cited

U.S. PATENT DOCUMENTS

| | | | | |
|---|---|---|---|---|
| 8,078,988 B2 * | 12/2011 | Iga | ................ | G06Q 10/0631 715/788 |
| 9,307,294 B2 * | 4/2016 | Hiyoshi | .............. | G06F 3/04815 |
| 2004/0160463 A1 * | 8/2004 | Battles | ................. | G06F 3/0482 715/814 |
| 2008/0215978 A1 * | 9/2008 | Bamba | ................. | G06F 3/0482 715/713 |
| 2010/0162108 A1 * | 6/2010 | Stallings | ............ | G06F 3/04817 715/702 |
| 2012/0124525 A1 * | 5/2012 | Kang | ..................... | G06F 3/011 715/863 |
| 2013/0276030 A1 * | 10/2013 | Fujimoto | .............. | G06F 3/0482 725/40 |

FOREIGN PATENT DOCUMENTS

| JP | 2004274135 A | * | 9/2004 |
|---|---|---|---|
| JP | 2011107736 A | * | 6/2011 |
| JP | 2011227540 A | * | 11/2011 |

* cited by examiner

Primary Examiner — Antoinette Spinks
(74) Attorney, Agent, or Firm — Chip Law Group

(57) ABSTRACT

There is provided a display control device including a display control unit configured to display a plurality of items at least including a function name on a display screen, and a selection receiving unit configured to receive selection of one item among the plurality of displayed items. When a predetermined operation input is performed on the display screen, the display control unit displays both associated information associated with a function of the one selected item and associated information associated with functions of other items not selected.

17 Claims, 10 Drawing Sheets

CONTROL OF DISPLAY OF PLURALITY OF ITEMS AND ASSOCIATED INFORMATION

TECHNICAL FIELD

The present disclosure relates to a display control device, a display control method, and a program.

BACKGROUND ART

In recent years, mobile devices, such as digital cameras, have various functions, and a user sets a desired function on a display screen. For example, a user selects one item from a list of a plurality of items (each item corresponds to each function) displayed on the display screen, and sets a function.

Patent Literature 1 shown below discloses a technique of displaying setting information to a device in such a manner that a user easily grasps the entire setting item and the set state of each setting information.

CITATION LIST

Patent Literature

Patent Literature 1: JP 2006-133976A

SUMMARY OF INVENTION

Technical Problem

A plurality of items displayed on a display screen usually include only function names (item names). Therefore, when a user is not familiar with the displayed items, the user causes a device to display an explanation of each item and understands the contents of the corresponding function.

However, in Patent Literature 1, an explanation is displayed only for one item. With such a display method, when a user is not familiar with a plurality of items, the user needs to cause a device to display the explanations of the items one by one, which not only complicates the operation but makes it difficult for the user to distinguish the contents of the plurality of items.

Thus, the present disclosure proposes a method which enables a user to easily distinguish the contents of a plurality of items displayed on a display screen.

Solution to Problem

According to the present disclosure, there is provided a display control device including a display control unit configured to display a plurality of items at least including a function name on a display screen, and a selection receiving unit configured to receive selection of one item among the plurality of displayed items. When a predetermined operation input is performed on the display screen, the display control unit displays both associated information associated with a function of the one selected item and associated information associated with functions of other items not selected.

According to the display control device, when a predetermined operation input is performed on the display screen, the display control unit displays both the associated information associated with the function of the one selected item and the associated information associated with functions of the other items not selected. More specifically, not only the associated information of the one selected item but the associated information of all the items is displayed. In such a case, a user can easily distinguish the contents of each function by comparing the associated information of each function collectively displayed, for example.

According to an embodiment of the present disclosure, there is provided a display control method including displaying a plurality of items at least including a function name on a display screen, receiving selection of one item among the plurality of displayed items, and when a predetermined operation input is performed on the display screen, displaying both associated information associated with a function of the one selected item and associated information associated with functions of other items not selected.

According to an embodiment of the present disclosure, there is provided a program for causing a computer to execute displaying a plurality of items at least including a function name on a display screen, receiving selection of one item among the plurality of displayed items, and when a predetermined operation input is performed on the display screen, displaying both associated information associated with a function of the one selected item and associated information associated with functions of other items not selected.

Advantageous Effects of Invention

As described above, the present disclosure enables a user to easily distinguish the contents of a plurality of items displayed on a display screen.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description is given in the following order.
1. First Embodiment
   1-1. Appearance Configuration of Mobile Device
   1-2. Functional Configuration of Mobile Device
   1-3. Display Example of Setting Screen
   1-4. Display Processing of Setting Screen of Mobile Device
2. Second Embodiment
3. Hardware configuration
4. Conclusion

1. First Embodiment

(1-1. Appearance Configuration of Mobile Device)

An example of the appearance configuration of a mobile device 100 according to a first embodiment of the present disclosure is described with reference to FIG. 1.

Figure 1:
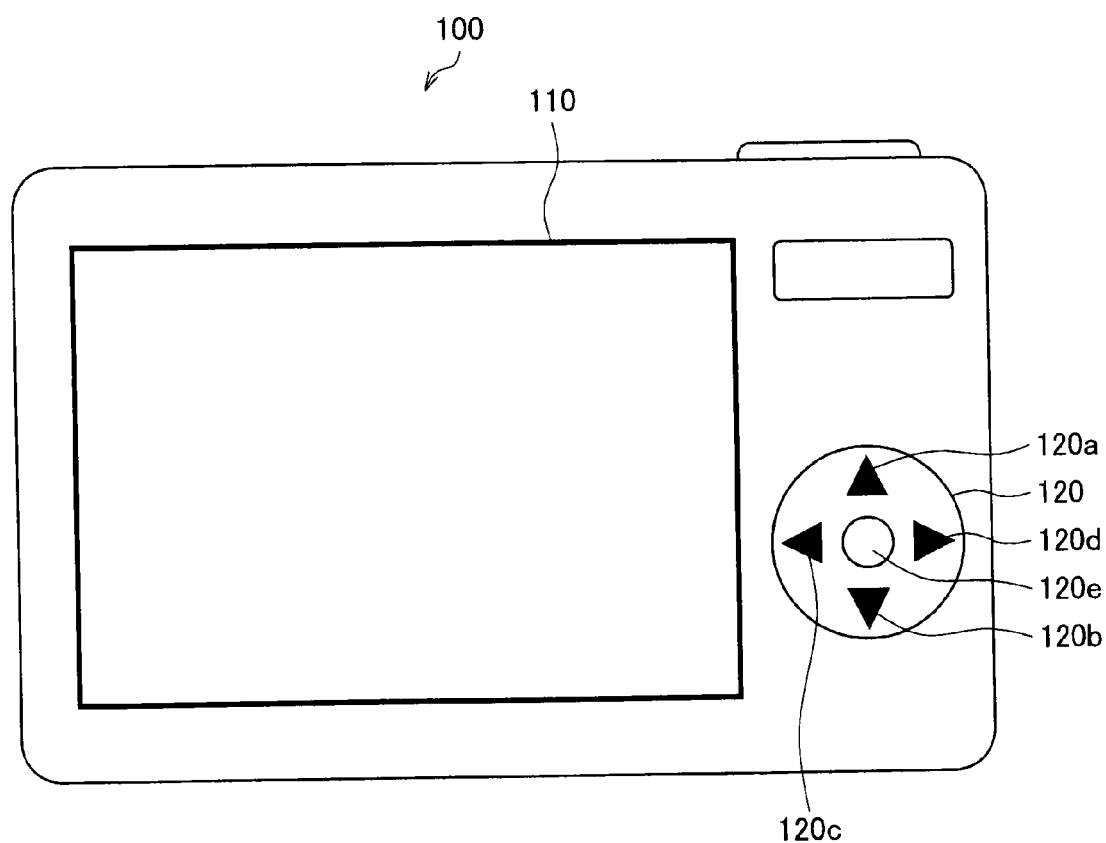
FIG. 1 is a view illustrating an example of the appearance configuration of a mobile device 100 according to a first embodiment of the present disclosure.

FIG. 1 is a view illustrating an example of the appearance configuration of the mobile device 100 according to the first embodiment of the present disclosure. The mobile device 100 is a digital camera of imaging a subject, for example. As illustrated in FIG. 1, the mobile device 100 has a display unit 110 and an operation unit 120.

The display unit 110 displays various kinds of information. For example, the display unit 110 displays a setting screen for setting various functions. The display unit 110 is constituted by a display device, such as a liquid crystal display or an organic electroluminescence display. In the mobile device 100, the size of the display unit 110 is small considering user's portability. Therefore, the amount of information which can be simultaneously displayed on one screen is limited.

The operation unit 120 has a function of receiving a user's operation input. For example, the operation unit 120 contains direction keys 120a to 120d (an upward direction key 120a, a downward direction key 120b, a leftward direction key 120c, and a rightward direction key 120d) and a determination button 120e. For example, when the setting screen including a plurality of items is displayed on the display unit 110, a user selects one of the items by the direction keys 120a to 120d, and then presses down the determination button 120e, whereby the selected item is determined.

The description above is given taking the digital camera as an example of the mobile device 100 but the present disclosure is not limited thereto. For example, the mobile device 100 may be a cellular phone, a smart phone, a PDA, an electronic dictionary, and the like.

Moreover, in the description above, the mobile device 100 is configured to have the operation unit 120 containing the direction keys 120a to 120d and the determination button 120e but the present disclosure is not limited thereto. For example, it may be configured so that the mobile device 100 has a touch panel and a user selects an item on a setting screen by touch operation.

(1-2. Functional Configuration of Mobile Device)

Figure 2:
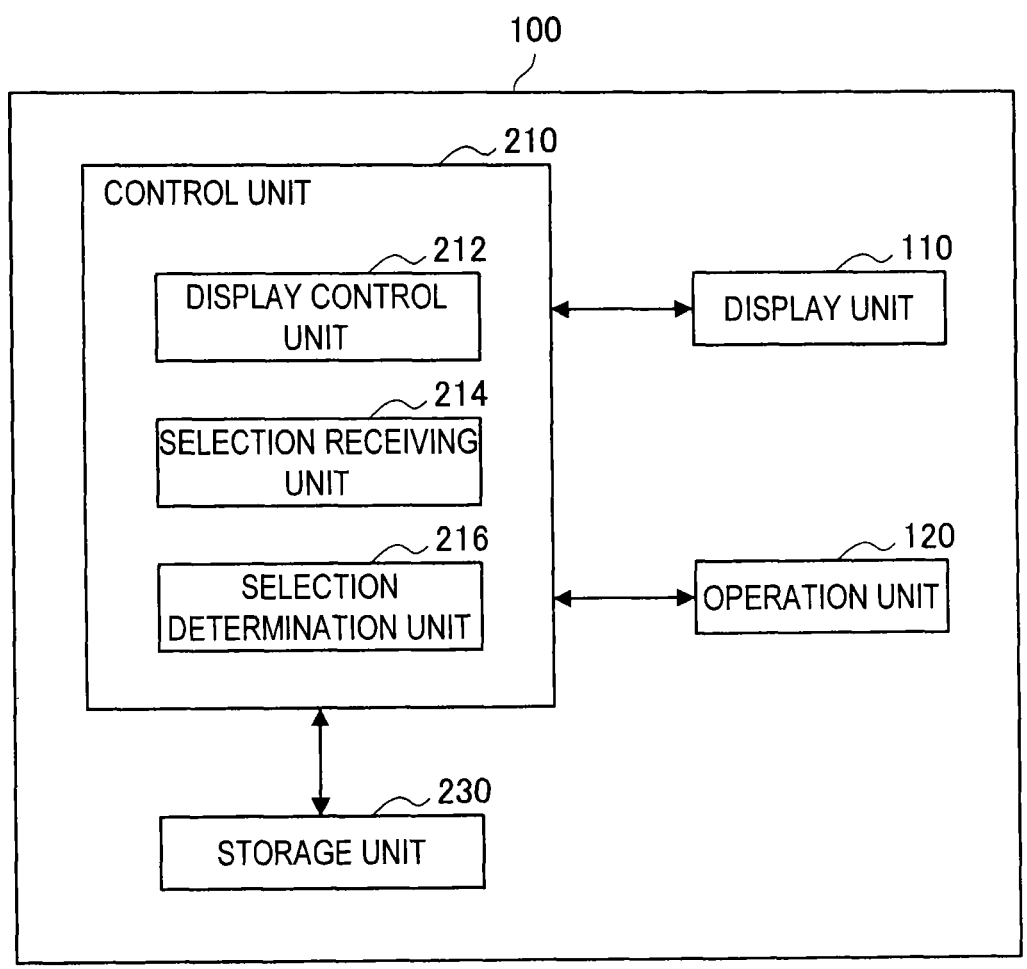
FIG. 2 is a block diagram illustrating an example of the functional configuration of the mobile device 100.

An example of the functional configuration of the mobile device 100 is described with reference to FIG. 2. FIG. 2 is a block diagram illustrating an example of the functional configuration of the mobile device 100. As illustrated in FIG. 2, the mobile device 100 has a control unit 210 and a storage unit 230.

The control unit 210 has a function of controlling the entire operation of the mobile device 100. The control unit 210 is constituted by CPU, ROM, and RAM, for example. The control unit 210 has a display control unit 212, a selection receiving unit 214, and a selection determination unit 216.

Figure 3:
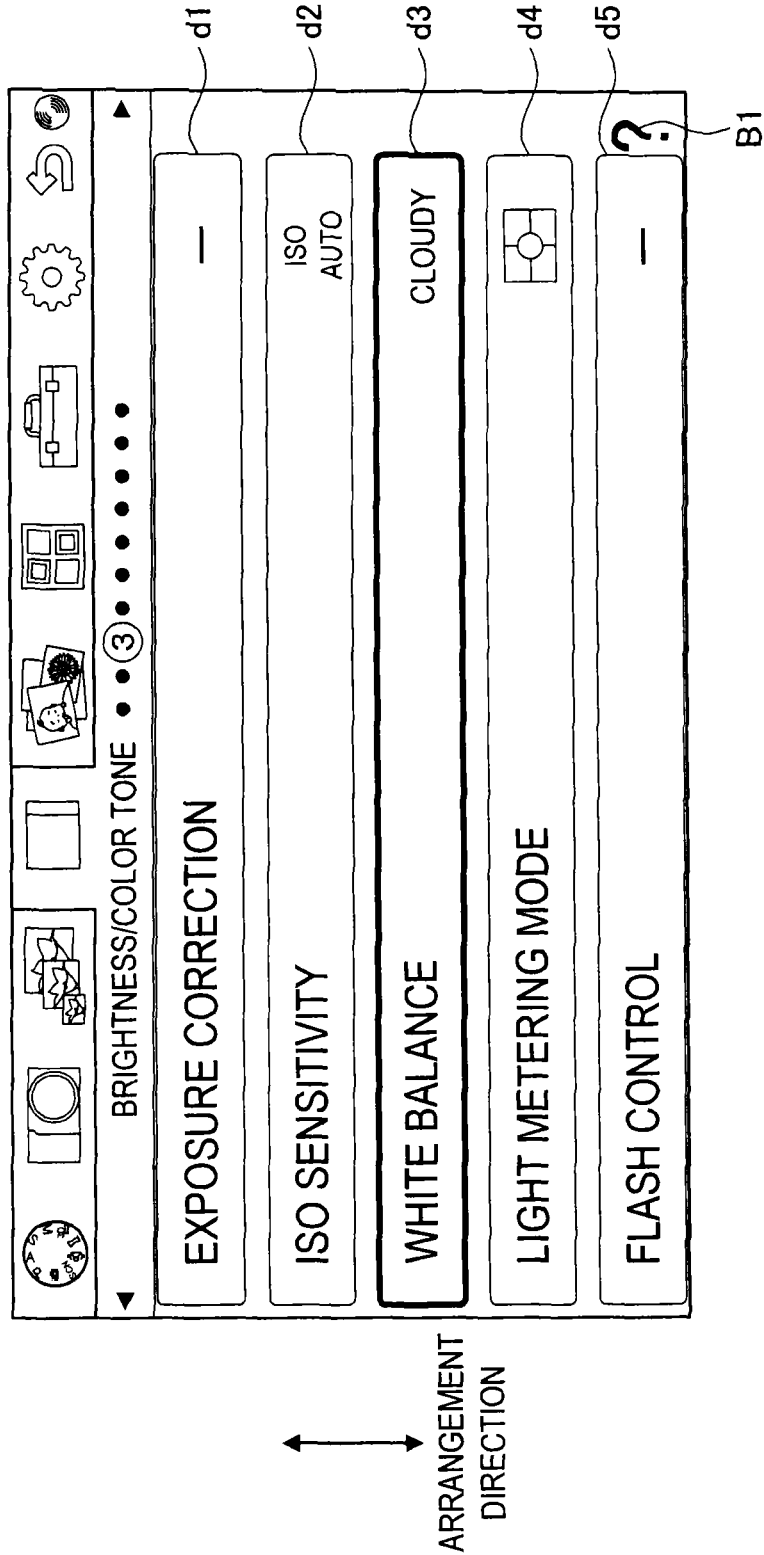
FIG. 3 is a view illustrating an example of a setting screen for setting various functions displayed by a display unit 110.

The display control unit 212 controls the display of various kinds of information by the display unit 110. For example, the display control unit 212 displays a plurality of items each at least including a function name on the display screen of the display unit 110 (FIG. 3). In this operation, the display control unit 212 displays the items in such a manner as that a user can select one item among the plurality of items.

The selection receiving unit 214 receives an operation input by the operation unit 120. For example, the selection receiving unit 214 receives selection of one item among the plurality of displayed items. A user can select one item among the plurality of items displayed on the display screen by operating the upward direction key 120a and the downward direction key 120b of the operation unit 120.

The selection determination unit 216 determines the selection of one item among the plurality of displayed items. For example, a user presses down the determination button 120e after the user selects one item, the selection of the one item is determined. Then, when the selection is determined, the screen is changed to the following screen corresponding to the selected item (for example, screen for selecting settings).

The storage unit 230 has a function of storing various kinds of information to be used by the control unit 210. For example, the storage unit 230 stores explanations, settings, and the like of functions to be displayed on the display unit 110. The storage unit 230 is constituted by a storage device, such as a magnetic storage device, a semiconductor storage device, and an optical storage device.

In this embodiment, in order for a user to be able to easily distinguish the contents of the plurality of items displayed on the display screen of the display unit 110, the display control unit 212 controls the display of the display unit 110 as follows.

When a predetermined operation input is performed on the display screen, the display control unit 212 displays both associated information associated with the function of the one selected item and associated information associated with the functions of the other items not selected. More specifically, the display control unit 212 displays not only the associated information of the one selected item but the associated information of all the items. Thus, a user can easily understand the contents of each function by comparing the associated information of all the items.

Herein, the associated information includes a functional explanation of the corresponding item. The display of a functional explanation enables a user to easily understand the contents of each function. The predetermined operation input is operation of pressing down a button displayed on the display screen, for example.

The item to be displayed on the display screen is an object having a shape (for example, a rectangular shape). Then, when a predetermined operation input is performed on the display screen, the display control unit 212 changes the shape of the item and also displays associated information in the item whose shape is changed. Thus, the user can easily grasp an item to which the associated information to be additionally displayed corresponds, and thus the user can easily understand the contents of each item.

The plurality of items are displayed along the predetermined arrangement direction. When a predetermined operation input is performed on the display screen, the display control unit 212 gradually changes the shape of an item along the arrangement direction. More specifically, the shape is extended along the arrangement direction. Thus, due to the fact that the shape of the item gradually changes, a user easily visually grasps the changes in the display.

When gradually changing the shape of an item along the arrangement direction, the display control unit 212 sequentially inserts associated information into the item, and then displays the same. For example, the display control unit 212 adds character information line-by-line into the item. Thus, the associated information to be additionally displayed in the item can be easily grasped.

When a predetermined operation input is performed on the display screen, the display control unit 212 changes the shapes of a plurality of items and also displays the corresponding associated information in each item whose shape is changed. More specifically, each associated information of the plurality of items is simultaneously displayed. Since two or more pieces of associated information are simultaneously displayed, a user easily visually grasps the changes in the display.

The display control unit 212 displays the plurality of items whose shapes are changed on the display screen in such a manner that the position of the one selected item is located on the middle of the display screen in the arrangement direction. Since the one selected item is located on the middle of the display screen, a user can easily grasp the contents of the one selected item.

The display control unit 212 displays the function names and the explanations in such a manner that the character size of the function names of items is larger than the character size of the explanations. Thus, a user can easily distinguish the function names and the explanations.

When the number of characters forming the explanation is larger than a predetermined number, the display control unit 212 displays the explanation in a small character size, and thus the entire explanation can be displayed even when the number of characters of the explanation is large.

(1-3. Display Example of Setting Screen)

FIG. 3 is a view illustrating an example of a setting screen for setting various functions displayed by the display unit 110. Herein, a description is given taking a setting screen in a digital camera as the mobile device 100 as an example.

The setting screen illustrated in FIG. 3 is a screen for setting the brightness and the color tone in imaging. In FIG. 3, a plurality of setting items relating to the brightness or the color tone are displayed in such a manner as to be arranged along the predetermined arrangement direction. Herein, exposure correction (item d1), ISO sensitivity (item d2), white balance (item d3), light metering mode (item d4), and flash control (item d5) are displayed in such a manner as to be able to be selected.

In each of the items d1 to d5, a function name (item name) and a setting are displayed. For example, in the item d3, "White balance" as the function name and "Cloudy" as the setting are displayed. A user can select any one of the items d1 to d5 by the direction keys 120a to 120d of the operation unit 120. In FIG. 3, since the user selects the item d3 (white balance), the item d3 is focused.

On a setting screen S1 illustrated in FIG. 3, an explanation adding button B1 which can be pressed down by a user is displayed. The explanation adding button B1 is a button for additionally displaying or hiding a functional explanation of each item. By pressing down of the explanation adding button B1 by a user, the user switches display/hiding of the functional explanation of each item.

Figure 4:
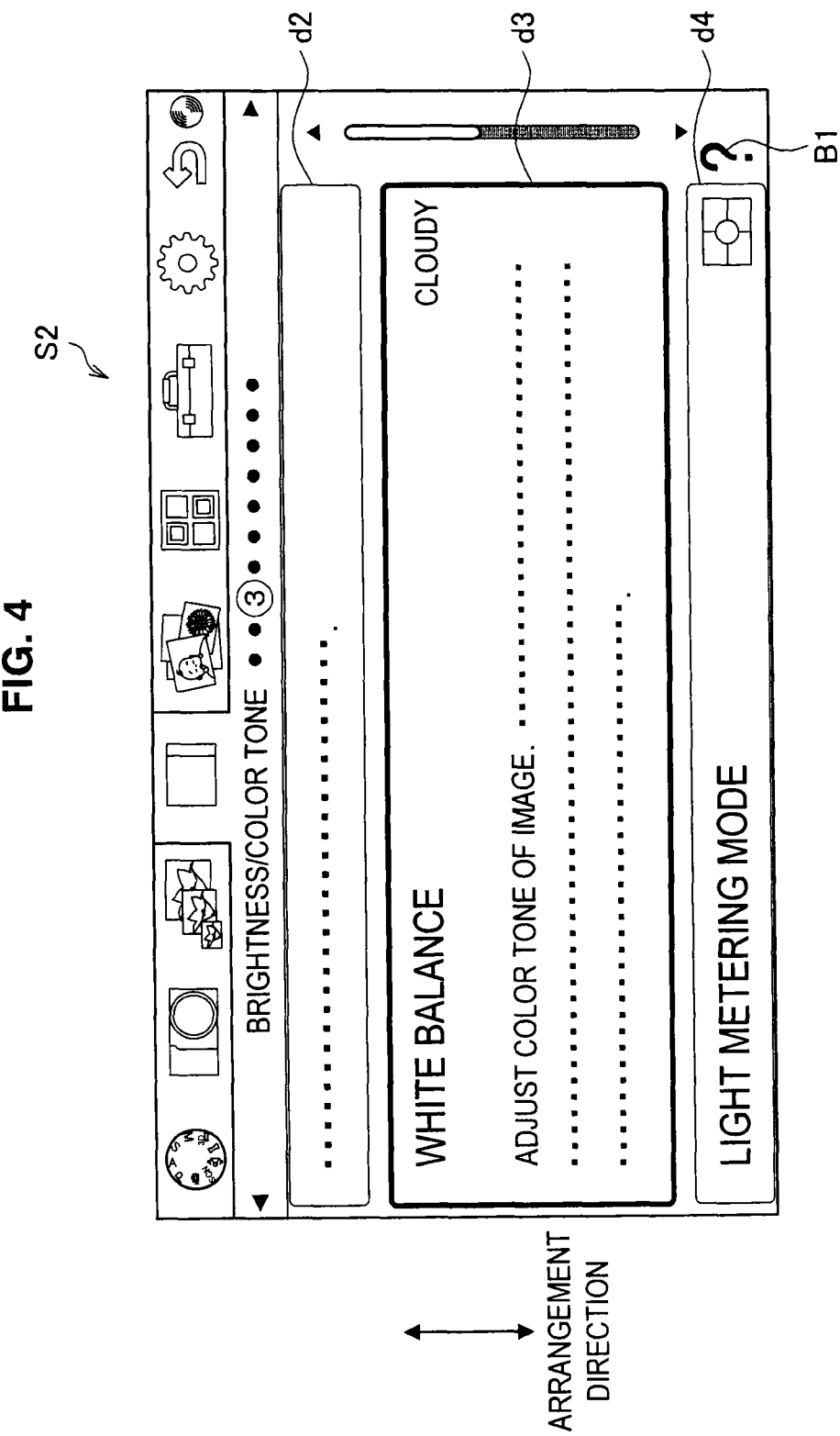
FIG. 4 is a view illustrating a display example of a functional explanation of each item on the setting screen.

FIG. 4 is a view illustrating a display example of the functional explanation of each item on the setting screen. On a setting screen S2 illustrated in FIG. 4, a functional explanation is additionally displayed by pressing down of the explanation adding button B1 by a user in the state of FIG. 3. In this operation, a functional explanation is added in all the items. When the explanation adding button B1 is pressed down again on the setting screen S2 of FIG. 4, the screen is changed to the setting screen S1 illustrated in FIG. 3 (i.e., the functional explanation is hidden). In FIG. 4, the size of the display unit 110 is small, and therefore only the items d2 to d4 are shown among the items d1 to d5 to which the functional explanation is added.

Figure 5:
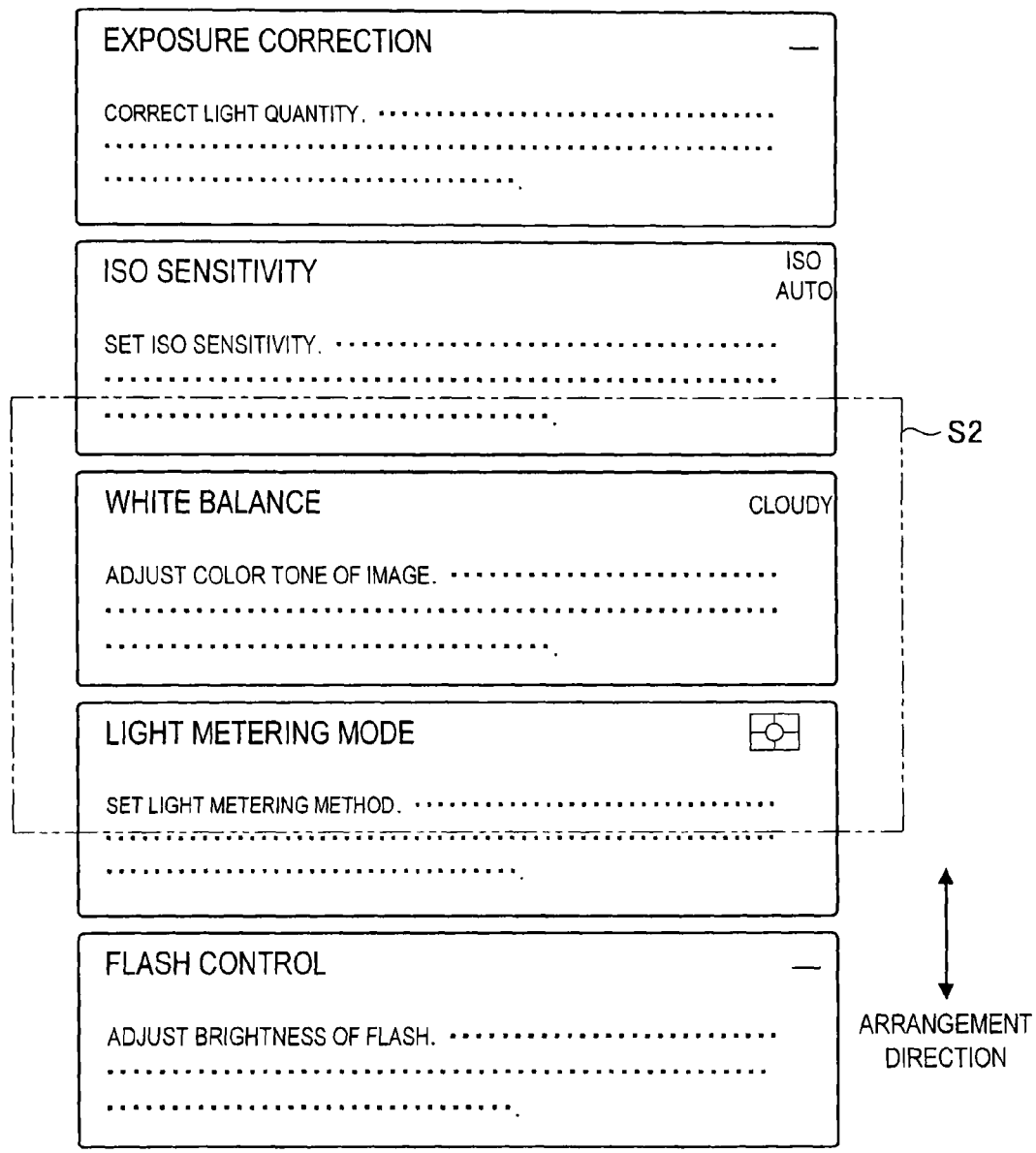
FIG. 5 explains an additional display of a functional explanation in each item.

FIG. 5 explains the additional display of the functional explanation in each item. As illustrated in FIG. 5, a functional explanation is added in each of the items d1 to d5. A region shown by a dotted line in FIG. 5 is a region which the display unit 110 can display in one screen (Setting screen S2 illustrated in FIG. 4). Therefore, the items to be displayed are switched by scrolling the screen of the display unit 110.

The functional explanation is located under the function name as illustrated in FIG. 5, and only the predetermined number of lines is displayed. However, the position of the functional explanation is not limited to the example above. For example, the functional explanation may be located beside the function name.

The character size of the functional explanation is smaller than the character size of the function name. Thus, even when both the function name and the functional explanation are displayed, a user can easily distinguish the function name and the functional explanation. The size of the functional explanation and the function name are not limited to the example above. For example, the character size of the function name may be the same as the character size of the functional explanation.

Moreover, the functional explanation is displayed only in the predetermined number of lines (for example, three lines). When the number of characters of the functional explanation is larger than the predetermined number, the functional explanation is displayed in a small character size. Thus, the entire functional explanation can be displayed in the predetermined number of lines.

The color of the characters of the function names may be different from the color of the characters of the functional explanation. In such a case, even when both the function name and the functional explanation are displayed in an item, a user can easily distinguish the function name and the functional explanation.

Figure 6:
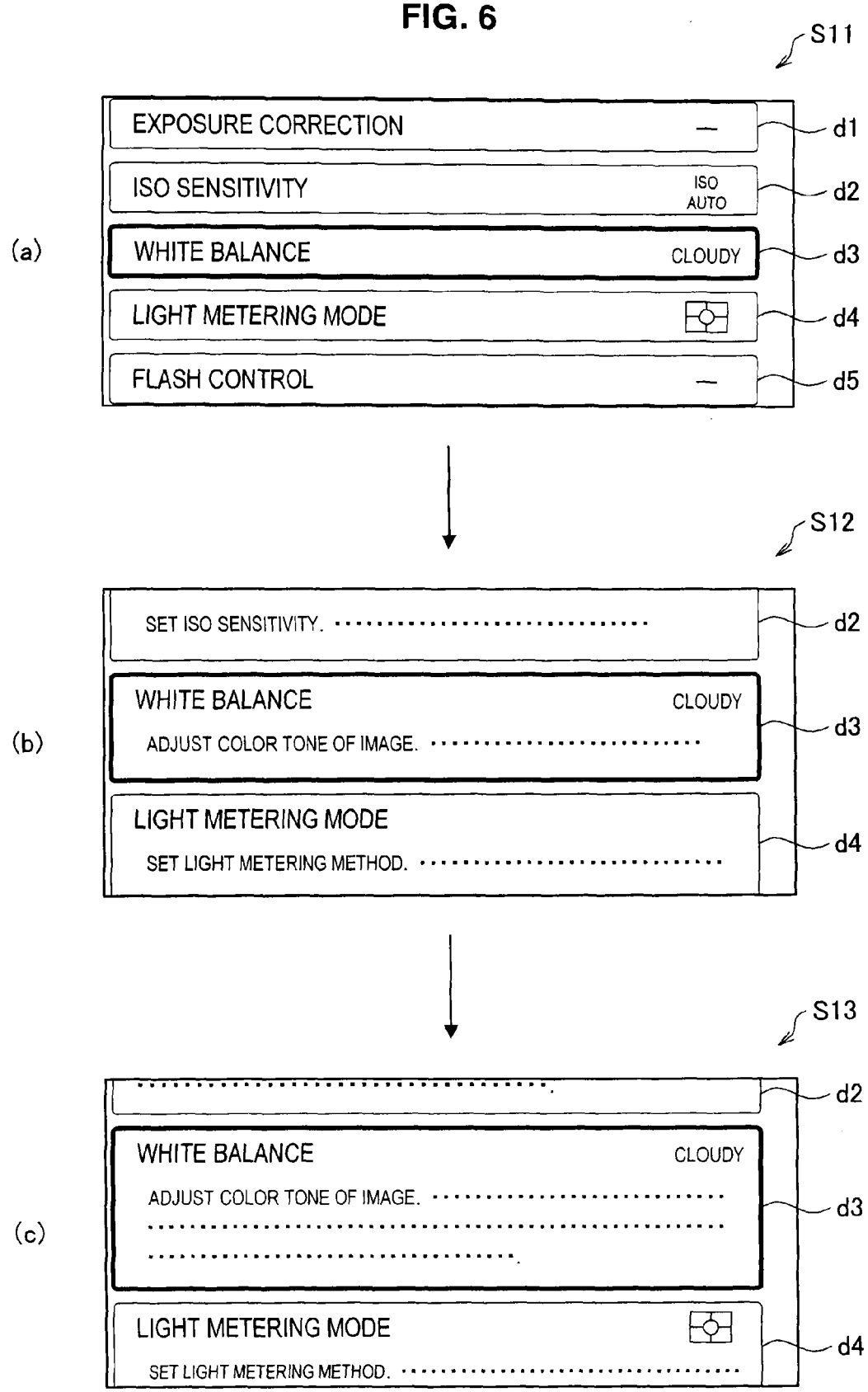
FIG. 6 includes FIGS. 6(a) to 6(c) which are schematic views illustrating a display example of animation.

When the state is changed from the state of FIG. 3 to the state of FIG. 4, animation of changing the size of each item is displayed as illustrated in FIG. 6.

FIG. 6 includes FIGS. 6(a) to 6(c) which are schematic views illustrating a display example of animation. As illustrated in FIGS. 6(a) to 6(c), when the explanation adding button B1 is pressed down in the state illustrated in FIG. 3, each of the items d1 to d5 gradually extends in the arrangement direction. Specifically, each of the items d1 to d5 gradually extends to both sides in the arrangement direction. The present disclosure is not limited thereto and each of the items d1 to d5 may gradually extend to one side in the arrangement direction. Then, when each of the items d1 to d5 extends in the arrangement direction, a functional explanation is inserted under the item. Specifically, the explanation is inserted line-by-line. Thus, a user can visually grasp that the functional explanation is added.

In the animation of FIG. 6, each item is changed in such a manner as to extend in the arrangement direction in the state where the focused item is located at the center of the screen. Thus, the item selected by a user can be prevented from moving out of the screen.

(1-4. Display Processing of Setting Screen of Mobile Device)

An example of display processing of the setting screen of the mobile device 100 is described with reference to FIG. 7. The display processing illustrated in FIG. 7 is realized by execution of a program stored in the ROM by the CPU of the control unit 210 of the mobile device 100.

The program to be executed may be stored in a recording medium, such as CD (Compact Disk), DVD (Digital Versatile Disk), and a memory card, and may be downloaded from a server and the like through the Internet.

Figure 7:
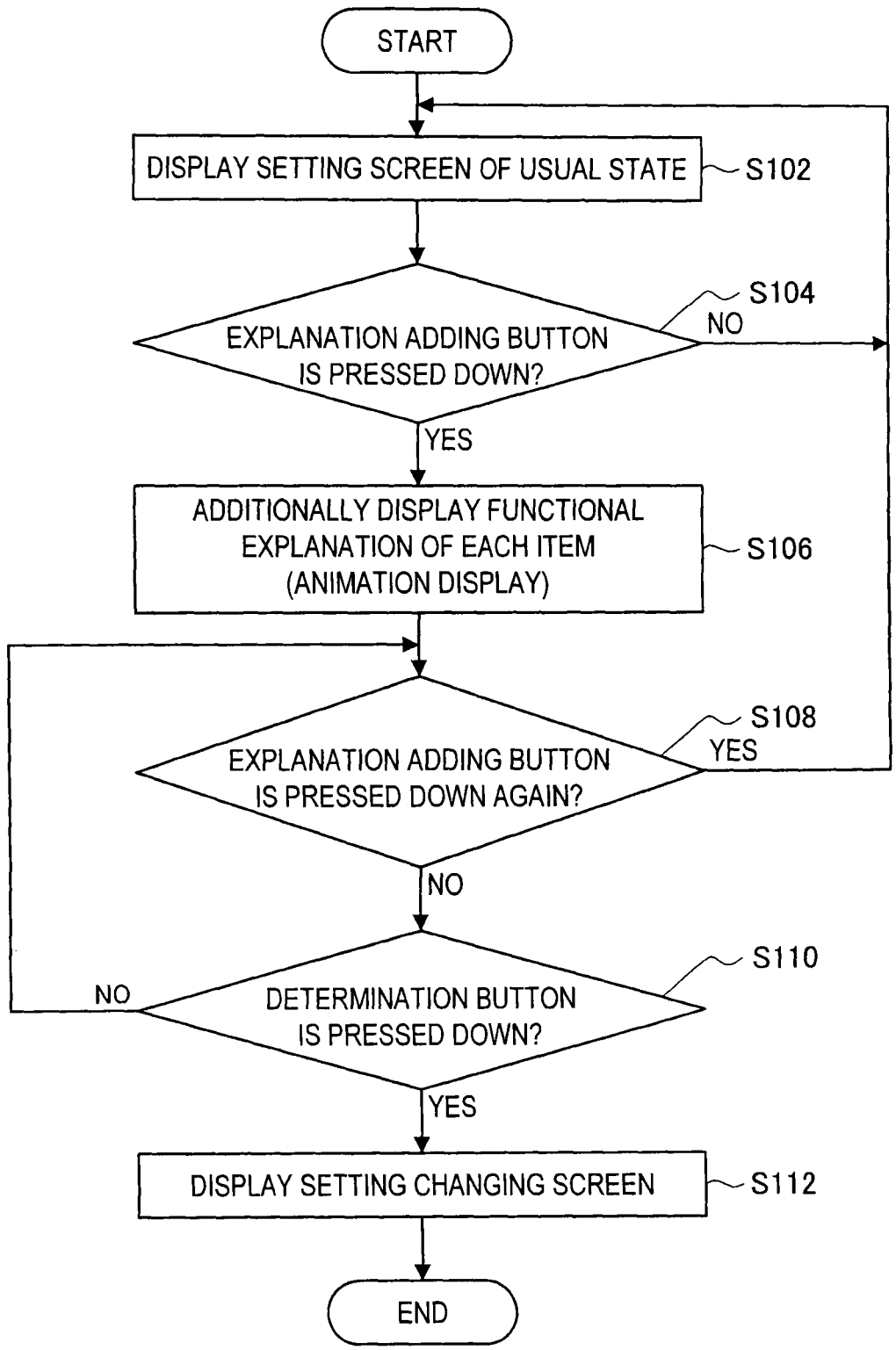
FIG. 7 is a flow chart showing an example of display processing of the setting screen of the mobile device 100.

FIG. 7 is a flow chart showing an example of display processing of the setting screen of the mobile device 100. In FIG. 7, the process is started from a state where the setting screen of a usual state (state where a functional explanation is hidden) illustrated in FIG. 3 is displayed (Step S102), for example. Then, a user can select a desired item by operating the upward direction key 120*a* and the downward direction key 120*b* while the setting screen is being displayed.

Next, the control unit 210 judges whether or not the explanation adding button B1 is pressed down (Step S104). When the explanation adding button B1 is pressed down in Step S104, the control unit 210 changes the state from the state illustrated in FIG. 3 to the state illustrated in FIG. 4, and then additionally displays a functional explanation of each item (Step S106). In the process, as described with reference to FIG. 6, the shape of each of the items d1 to d5 changes, and then the functional explanation is inserted into the item whose shape is changed. A user can change the item to be selected by operating the upward direction key 120*a* and the downward direction key 120*b* in the state where the functional explanation is additionally displayed.

Next, the control unit 210 judges whether or not the explanation adding button B1 is pressed down again (Step S108). When the explanation adding button B1 is pressed down again in Step S108 (Yes), the control unit 210 hides the functional explanation, and then returns the state of the setting screen to the usual state (Step S102).

Next, the control unit 210 judges whether or not the determination button 120*e* is pressed down in the state where an item is selected (Step S110). When the determination button 120*e* is pressed down in Step S110 (Yes), the control unit 210 changes the screen to a screen for changing the setting of the selected item (Step S112). In this screen, a user changes the setting.

According to the display processing described above, when the explanation adding button B1 is pressed down on the setting screen S1 of the usual state illustrated in FIG. 3, both the functional explanation of the one selected item (focused item) and functional explanations of the other items not selected are displayed. Thus, a user can easily distinguish the contents of each function by comparing the functional explanation of the functions collectively displayed.

2. Second Embodiment

In the first embodiment described above, when a user presses down the button B1 in the usual state of the setting screen S1 illustrated in FIG. 3, a functional explanation as associated information is additionally displayed in each item as illustrated in FIG. 3 and FIG. 4 (The screen is changed to the setting screen S2 illustrated in FIG. 4). On the other hand, in the second embodiment, settings which can be selected in each item are additionally displayed, in place of the functional explanation, as illustrated in FIG. 8.

Figure 8:
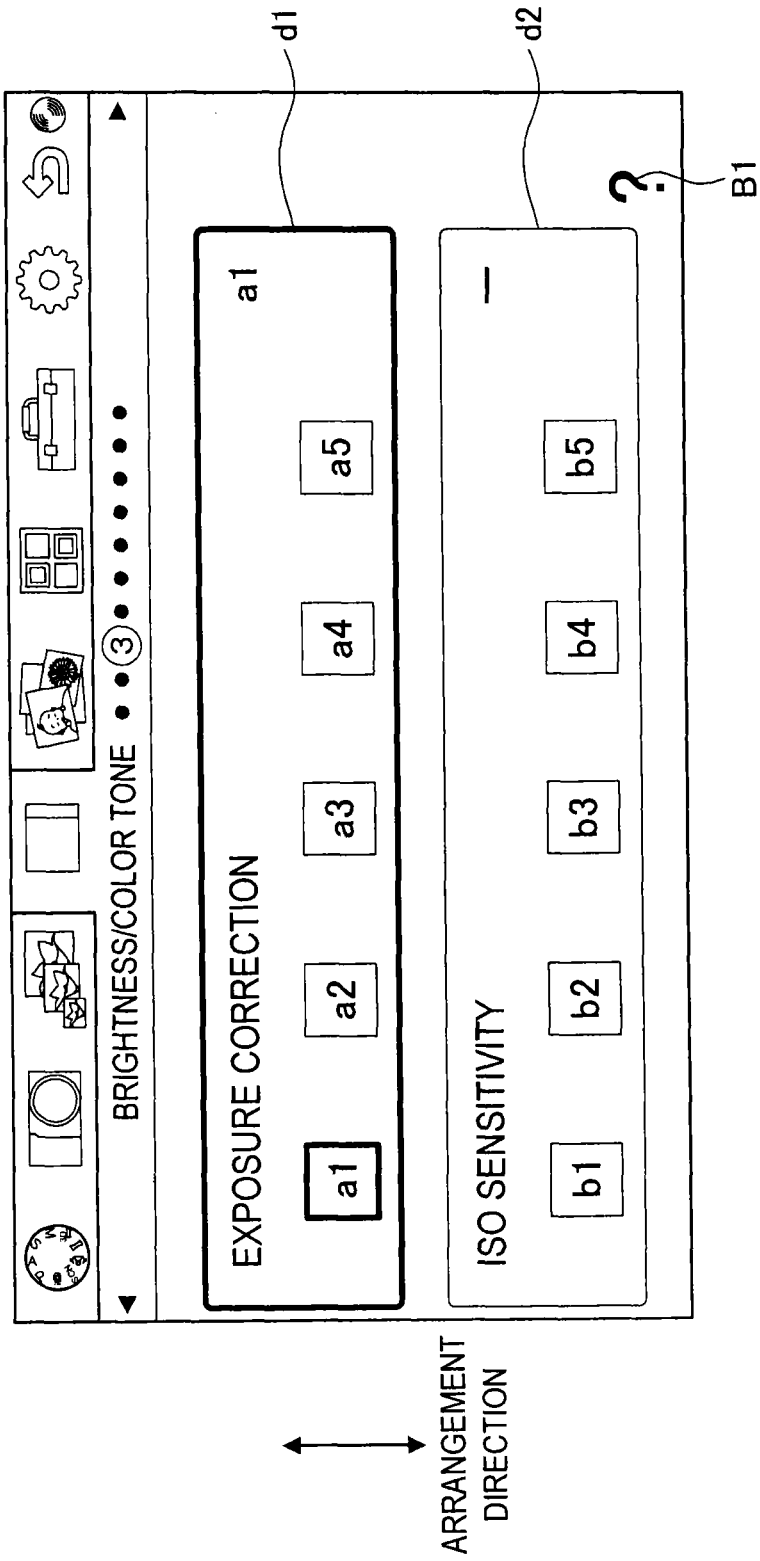
FIG. 8 is a display example of a setting screen according to a second embodiment.

FIG. 8 illustrates a display example of the setting screen according to the second embodiment. A setting screen S21 illustrated in FIG. 8 is displayed when a user presses down the button B1 on the setting screen S1 illustrated in FIG. 3. When the screen is changed from the setting screen S1 of FIG. 3 to the setting screen S21 of FIG. 8, the animation described above with reference to FIG. 6 is performed.

As illustrated in FIG. 8, a function name and settings (for example, settings a1 to a5 of the item d1) which a user can select are displayed in each item. A user can select the settings of each item by operating the leftward key 120*c* and the rightward key 120*d*. For example, a user can select any one of the settings a1 to a5 for exposure correction when the exposure correction (item d1) is focused. Similarly, a user can select any one of settings b1 to b5 for ISO sensitivity when the ISO sensitivity is focused.

In the second embodiment, the settings which can be selected in other items vary based on the settings selected in one item in a plurality of items.

Figure 9:
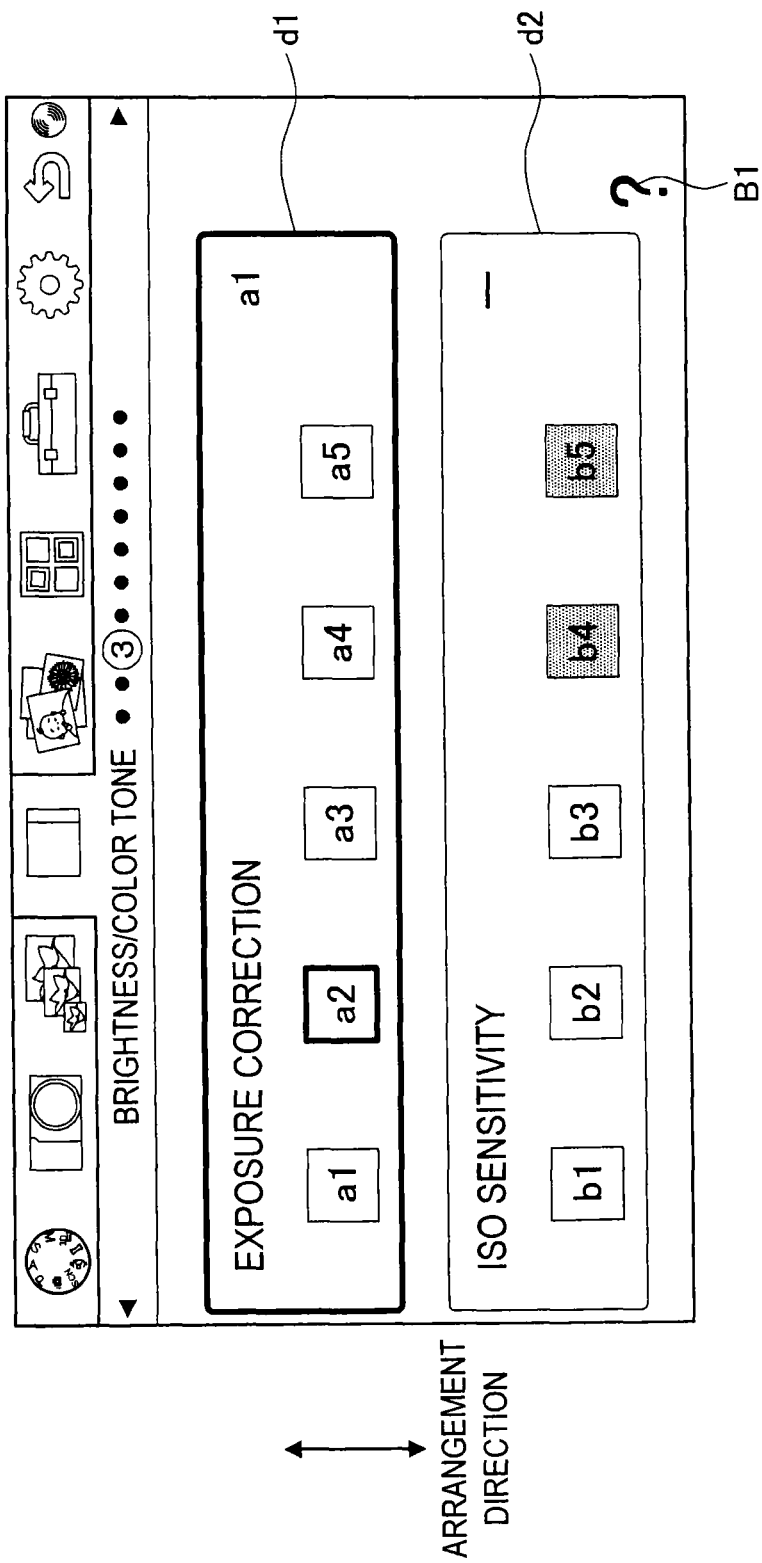
FIG. 9 is a display example of the setting screen according to the second embodiment.

In FIG. 8, when the setting a1 for exposure correction is selected, the settings b1 to b5 for ISO sensitivity are displayed in such a manner as to be selectable. On the other hand, as illustrated in FIG. 9, when the setting a2 for exposure correction is selected, the settings b1 to b3 are displayed in such a manner as to be selectable for the ISO sensitivity, and the settings b4 and b5 cannot be selected. Therefore, a user selects any one of the settings b1 to b3. FIG. 9 is a display example of the setting screen according to the second embodiment.

Thus, a user can visually grasp settings which can be selected based on the relevance between items when setting settings for a plurality of items. Therefore, the setting of the settings is facilitated, which improves user's operability.

3. Hardware Configuration

The display control operation performed by the mobile device 100 described above is realized by collaboration of the hardware configuration and software of the mobile device 100.

Figure 10:
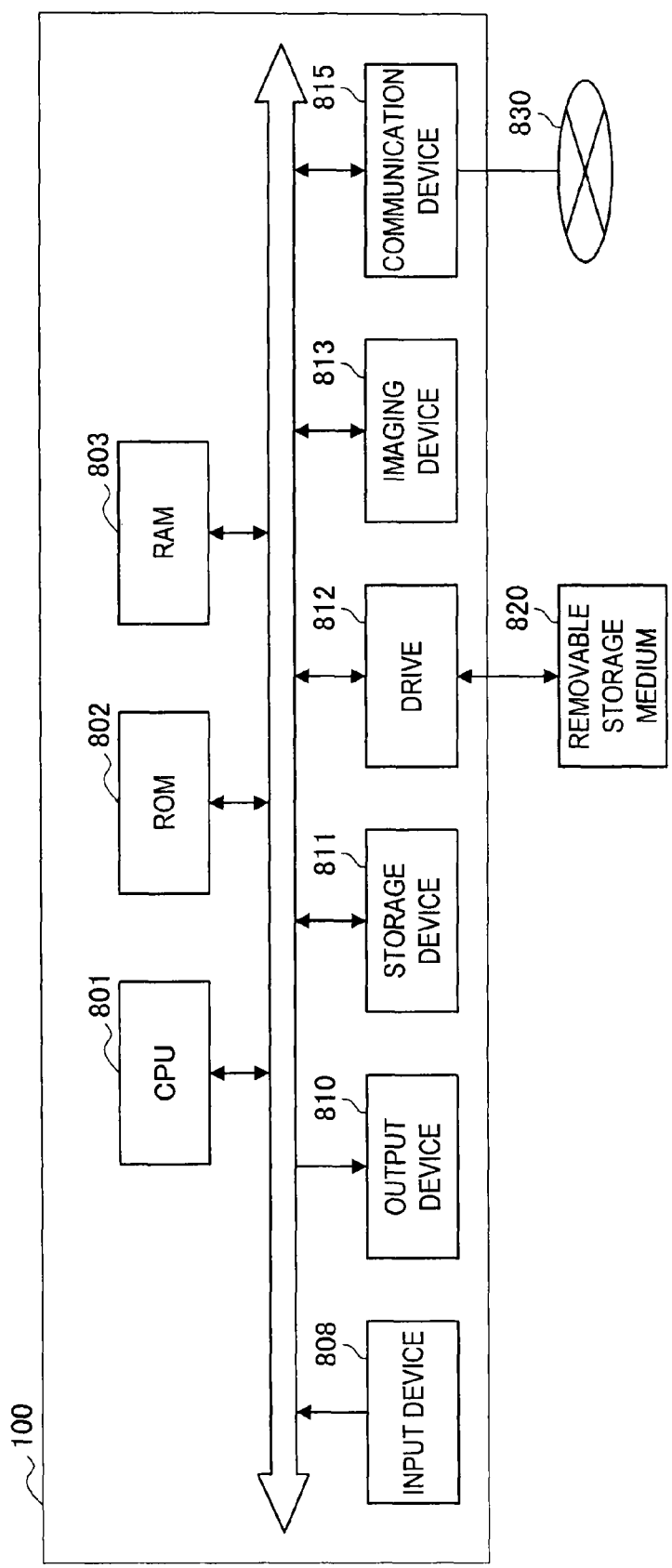
FIG. 10 is a view illustrating the hardware configuration of the mobile device 100.

FIG. 10 is an explanatory diagram illustrating the hardware configuration of the mobile device 100. As illustrated in FIG. 10, the mobile device 100 includes a central processing unit (CPU) 801, read only memory (ROM) 802, random access memory (RAM) 803, an input device 808, an output device 810, a storage device 811, a drive 812, an imaging device 813, and a communication device 815.

The CPU 801 functions as a processing device and a control device, and controls the whole operation of the mobile device 100 in accordance with a variety of programs. The CPU 801 may also be a microprocessor. The ROM 802 stores a program, an operation parameter, or the like that is used by the CPU 801. The RAM 803 temporarily stores a program used upon execution of the CPU 801, a parameter that changes as necessary for the execution, or the like. These are connected to each other by a host bus including a CPU bus.

The input device 808 includes an input means such as a mouse, a keyboard, a touch panel, a button, a microphone, a switch, and a lever for a user to input information, and an input control circuit that generates an input signal on the basis of the input from the user and outputs the input signal to the CPU 801. A user of the mobile device 100 can input a variety of data to the mobile device 100 and request the mobile device 100 to perform a processing operation by operating the input device 808.

The output device 810 includes a display device such as a liquid crystal display (LCD) device, an organic light emitting diode (OLED) device, and a lamp. The output device 810 further includes an audio output device such as a speaker and a headphone. The display device, for example, displays a shot image, a generated image, and the like. Meanwhile, the audio output device converts audio data and the like to a sound, and outputs the sound.

The storage device 811 is a data storage device configured as an example of the storage unit of the mobile device 100 according to the present embodiment. The storage device 811 may include a storage medium, a recording device that records data on a storage medium, a read-out device that reads data out from a storage medium, and a deletion device that deletes data recorded on a recording medium. The storage device 811 stores a program and a variety of data executed by the CPU 801.

The drive 812 is a reader/writer for a storage medium, and is built in or externally attached to the mobile device 100. The drive 812 reads out information recorded on a removable storage medium 820 such as mounted magnetic disks, optical discs, magneto-optical disks and semiconductor memory, and outputs the read-out information to the RAM 803. The drive 812 can also write information into a removable storage medium 820.

The imaging device 813 includes an imaging optical system such as a photographing lens and a zoom lens that condenses light and a signal conversion element such as a charge coupled device (CCD) and a complementary metal oxide semiconductor (CMOS). The imaging optical system condenses light emitted from a subject to form an image of the subject on a signal conversion unit. The signal conversion element converts the formed image of the subject into an electric image signal.

The communication device 815 is, for example, a communication interface including a communication device for a connection to a network 830. The communication device 815 may also be a communication device supporting a wireless local area network (LAN), a communication device supporting Long Term Evolution (LTE), or a wired communication device performing wired communication.

Additionally, the network 830 is a wired or wireless transmission path through which information is transmitted and received between apparatuses connected to the network 830. The network 830 may include public networks such as the Internet, telephone networks and satellite networks, a variety of local area networks (LANs) including Ethernet (registered trademark), and wide area networks (WANs). The network 830 may also include leased line networks such as Internet protocol-virtual private networks (IP-VPNs).

4. Conclusion

When a prescribed operation input is performed on the display screen, the mobile device 100 described above displays both associated information (Explanation, settings, and the like of functions) associated with the function of the one selected item and associated information associated with functions of the other items not selected. More specifically, not only the associated information of the one selected item but the associated information of all the items are displayed as illustrated in FIG. 4.

In such a case, a user can easily distinguish the contents of each function by comparing the associated information (an explanation, a setting, and the like of each function) of each function collectively displayed, for example. Since the associated information is collectively displayed, the operation of displaying an explanation and the like for each item is unnecessary, which improves user's convenience.

Moreover, when displaying the associated information as described above, a case where a key is used as an operation unit and a case where a touch panel is used as an operation unit can be realized by the same operation. Therefore, a user needs not to change the operation according to the operation unit.

Moreover, when the size of the display screen of the display unit 110 is small as in the mobile device 100 of this embodiment, the display can be efficiently performed by displaying both the function name and the associated information in each item, even when the display region is limited.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

The steps illustrated in the flowcharts in the embodiments naturally include processes performed in the described and chronological order, and further include processes that are not necessarily performed in chronological order, but are also performed in parallel or are individually performed. Needless to say, it is also possible to change the order as necessary even in the steps for chronologically performing the processes.

The processing by the information processing apparatus described herein may be realized by any one of software, hardware, and a combination of software and hardware. Programs included in the software are stored in advance, for example, in recording media provided inside or outside of the respective apparatuses. Each program is read out, for example, by random access memory (RAM) when each program is executed, and executed by a processor such as a CPU.

REFERENCE SIGNS LIST

Additionally, the present technology may also be configured as below.

(1)
A display control device including:
a display control unit configured to display a plurality of items at least including a function name on a display screen; and
a selection receiving unit configured to receive selection of one item among the plurality of displayed items,
wherein, when a predetermined operation input is performed on the display screen, the display control unit displays both associated information associated with a function of the one selected item and associated information associated with functions of other items not selected.

(2)
The display control device according to (1),
wherein the item is an object having a shape, and
wherein, when a predetermined operation input is performed on the display screen, the display control unit changes the shape of the item and also displays the associated information in the item whose shape has been changed.

(3)
The display control device according to (2),
wherein the plurality of items are displayed along a predetermined arrangement direction, and
wherein, when a predetermined operation input is performed on the display screen, the display control unit gradually changes the shape of the item along the arrangement direction.

(4)
The display control device according to (3),
wherein the display control unit sequentially inserts and displays the associated information in the item while gradually changing the shape of the item along the arrangement direction.

(5)
The display control device according to any one of (1) to (4),
wherein, when a predetermined operation input is performed on the display screen, the display control unit simultaneously changes shapes of the plurality of items and also displays the corresponding associated information in each item whose shape has been changed.

(6)

The display control device according to (5), wherein the plurality of items are displayed along the predetermined arrangement direction, and wherein the display control unit displays the plurality of items whose shapes have been changed on the display screen in such a manner that a position of one selected item is located on middle of the display screen in the arrangement direction.

(7)

The display control device according to any one of (1) to (6), wherein the associated information includes a functional explanation of a corresponding item.

(8)

The display control device according to (7), wherein the display control unit displays the function name and the explanation in such a manner that a character size of the function name of the item is larger than a character size of the explanation.

(9)

The display control device according to (7) or (8), wherein the display control unit displays the explanation in a small character size in a case where the number of characters forming the explanation is larger than a predetermined number of characters.

(10)

The display control device according to any one of (1) to (9), wherein the associated information includes a setting which can be set to a function of a corresponding item.

(11)

A display control method including:

displaying a plurality of items at least including a function name on a display screen;

receiving selection of one item among the plurality of displayed items; and when a predetermined operation input is performed on the display screen, displaying both associated information associated with a function of the one selected item and associated information associated with functions of other items not selected.

(12)

A program for causing a computer to execute:

displaying a plurality of items at least including a function name on a display screen;

receiving selection of one item among the plurality of displayed items; and when a predetermined operation input is performed on the display screen, displaying both associated information associated with a function of the one selected item and associated information associated with functions of other items not selected.

100 mobile device
110 display unit
120 operation unit
120a to 120d direction key
120e determination button
210 control unit
212 display control unit
214 selection receiving unit
216 selection determination unit
230 storage unit

The invention claimed is:

1. A display control device, comprising:
one or more processors configured to:
    display a plurality of items on a display screen, wherein each of the plurality of items includes at least a function name;
    receive selection of a first item of the plurality of items;
    increase a size of the selected first item and a size of at least one second item of the plurality of items based on an operation input received via the display screen, wherein the at least one second item is different from the selected first item and wherein the increased size of the at least one second item is same as the increased size of the selected first item; and
    display associated information associated with a function of each of the selected first item and the at least one second item, such that each of the associated information is displayed adjacent to a corresponding item of the selected first item and the at least one second item,
    wherein first information corresponding to the selected first item is displayed along with second information corresponding to the at least one second item in a scrolling manner.

2. The display control device according to claim 1, wherein, based on the operation input, the one or more processors are further configured to:
change a shape of the at least one second item; and
display the associated information in the at least one second item whose shape has changed.

3. The display control device according to claim 1, wherein, based on the operation input, the one or more processors are further configured to gradually change the size of the plurality of items along an arrangement direction of the plurality of items.

4. The display control device according to claim 3, wherein the one or more processors are further configured to sequentially display the associated information in the plurality of items by a gradual change of the size of the plurality of items.

5. The display control device according to claim 1, wherein, the one or more processors are further configured to simultaneously change sizes of the plurality of items and display the associated information in each item whose size has been changed based on the operation input.

6. The display control device according to claim 1, wherein the associated information includes a functional explanation of the corresponding item of the plurality of items.

7. The display control device according to claim 6, wherein the one or more processors are further configured to display at least the function name and the functional explanation such that a first character size of at least the function name of the plurality of items is larger than a second character size of the functional explanation.

8. The display control device according to claim 6, wherein the one or more processors are further configured to display the functional explanation in a character size based on a number of characters in the functional explanation that is larger than a threshold number of characters.

9. The display control device according to claim 1, wherein the associated information includes settings associated with a function of the corresponding item of the plurality of items.

10. The display control device according to claim 1, wherein the operation input comprises a press of a button displayed on the display screen, wherein the button is placed at a different position than the plurality of items on the display screen.

11. The display control device according to claim 10, wherein, the one or more processors are further configured to hide the associated information associated with each of the selected first item and the at least one second item based on the press of the button again.

12. The display control device according to claim 1, wherein the one or more processors are further configured to:
   display the plurality of items along an arrangement direction of the plurality of items; and
   change sizes of the plurality of items in such a manner that a position of the selected first item is located at a center of the display screen in the arrangement direction.

13. The display control device according to claim 1, wherein the associated information associated with the function of the selected first item comprises a first plurality of settings and the associated information associated with the function of the at least one second item comprises a second plurality of settings.

14. The display control device according to claim 13, wherein, based on a selection of a first setting in the first plurality of settings, the one or more processors are further configured to display at least one second setting of the second plurality of settings.

15. The display control device according to claim 1, wherein the one or more processors are further configured to change the size of each of the plurality of items based on the operation input, such that the selected first item is prevented from moving out of the display screen.

16. A display control method, comprising:
   displaying a plurality of items on a display screen, wherein each of the plurality of items including at least a function name;
   receiving selection of a first item of the plurality of items;
   increasing a size of the selected first item and a size of at least one second item of the plurality of items based on an operation input received via the display screen, wherein the at least one second item is different from the selected first item and wherein the increased size of the at least one second item is same as the increased size of the selected first item; and
   displaying associated information associated with a function of each of the selected first item and the at least one second item, such that each of the associated information is displayed adjacent to a corresponding item of the selected first item and the at least one second item, wherein first information corresponding to the selected first item is displayed along with second information corresponding to the at least one second item in a scrolling manner.

17. A non-transitory computer readable medium having stored thereon, computer-executable instructions for causing a computer to execute operations, the operations comprising:
   displaying a plurality of items on a display screen, wherein each of the plurality of items including at least a function name;
   receiving selection of a first item of the plurality of items;
   increasing a size of the selected first item and a size of at least one second item of the plurality of items based on an operation input received via the display screen, wherein the at least one second item is different from the selected first item and wherein the increased size of the at least one second item is same as the increased size of the selected first item; and
   displaying associated information associated with a function of each of the selected first item and the at least one second item, such that each of the associated information is displayed adjacent to a corresponding item of the selected first item and the at least one second item, wherein first information corresponding to the selected first item is displayed along with second information corresponding to the at least one second item in a scrolling manner.

* * * * *